115,698

UNITED STATES PATENT OFFICE.

BENJAMIN F. BURROUGHS, OF WEST PERRY TOWNSHIP, PENNSYLVANIA.

IMPROVEMENT IN MEDICAL COMPOUNDS OR COUGH-SIRUPS.

Specification forming part of Letters Patent No. 115,698, dated June 6, 1871.

*To all whom it may concern:*

Be it known that I, BENJAMIN F. BURROUGHS, of West Perry Township, in the county of Snyder and State of Pennsylvania, have invented a new and valuable Improvement in Manufacture of Cough Sirup or Mixture; and I do hereby declare that the following is a full, clear, and exact description of the same.

My invention has relation to medical compounds; and consists in compounding and mixing together a novel composition of ingredients in the manner and proportions hereinafter mentioned, which is intended to be a valuable and efficient remedy for coughs, colds, indigestion, and other diseases.

My mixture is composed of roots and herbs, as follows: First. Roots—elecampane, four ounces; sarsaparilla, four ounces; wild cherry, four ounces. Second. Plants—hoarhound, two ounces; hyssop, two ounces. The above are put into a pot or caldron with twelve quarts of water. The entire mixture is allowed to boil until it is reduced to eight quarts. It is then strained through a very fine sieve or flannel cloth, when two pounds of loaf or crushed sugar are added. It is then again boiled until the mixture is reduced one-half, or to four quarts. It is then mixed thoroughly and strained again as before, when there is added one pint of proof alcohol, (95 per cent. proof,) Jamaica spirits, or pure whisky, when the compound is ready for bottling and use.

Having thus fully described my invention, what I claim as new, and desire to secure by Letters Patent, is—

The medical compound herein described, compounded in the manner, of the ingredients, in the proportions, and for the purpose specified.

In testimony that I claim the above I have hereunto subscribed my name in the presence of two witnesses.

BENJAMIN F. BURROUGHS.

Witnesses:
THOS. C. MACDOWELL,
LUCIUS ROGERS.